United States Patent [19]
Britton et al.

[11] Patent Number: 5,317,527
[45] Date of Patent: May 31, 1994

[54] LEADING ONE/ZERO BIT DETECTOR FOR FLOATING POINT OPERATION

[75] Inventors: Sharon M. Britton, Westboro; Randy Allmon, Hopedale; Sridhar Samudrala, Westboro, all of Mass.

[73] Assignee: Digital Equipment Corporation, Maynard, Mass.

[21] Appl. No.: 16,054

[22] Filed: Feb. 10, 1993

[51] Int. Cl.⁵ .......................... G06F 7/00; G06F 7/38
[52] U.S. Cl. ................................ 364/715.04; 364/748
[58] Field of Search ............. 364/748, 715.04, 715.09, 364/715.10

[56] References Cited

U.S. PATENT DOCUMENTS

| | | | |
|---|---|---|---|
| 4,922,446 | 5/1990 | Zurawski et al. | 364/748 |
| 4,926,369 | 5/1990 | Hokenek et al. | 364/748 |
| 5,010,508 | 4/1991 | Sit et al. | 364/715.04 X |
| 5,075,882 | 12/1991 | Sakai et al. | 364/748 |
| 5,204,825 | 4/1993 | Ng | 364/715.04 |

*Primary Examiner*—Tan V. Mai
*Attorney, Agent, or Firm*—Richard J. Paciulan; Denis G. Maloney

[57] ABSTRACT

A circuit is provided for using the input operands of a floating point addition or subtraction operation to detect the leading one or zero bit position in parallel with the arithmetic operation. This allows the alignment to be performed on the available result in the next cycle of the floating point operation and results in a significant performance advantage. The leading 1/0 detection is decoupled from the adder that is computing the result in parallel, eliminating the need for special circuitry to compute a carry-dependent adjustment signal. The single-bit fraction overflow that can result from leading 1/0 misprediction is corrected with existing circuitry during a later stage of computation.

17 Claims, 5 Drawing Sheets

L1 IS POSITION j + 1

FIG.2b
A: 0001011
B: 0000011
―――――――
C: 0001110
       ^
       j

L1 IS POSITION j

FIG.3a
A: 1101011
B: 0010111
―――――――
C: 0001010
      ^^
      i|
       j

L1 IS POSITION j + 1

FIG.3b
A: 1111001
B: 0010101
―――――――
C: 0001110
      ^^
      i|
       j

L1 IS POSITION j

FIG.4a
A: 1100001
B: 0000111
―――――――
C: 1101000
      ^^
      i|
       j

L0 IS POSITION j + 1

FIG.4b
A: 1101101
B: 0001111
―――――――
C: 1111100
      ^   ^
      i   |
          j

L0 IS POSITION j

LEADING ONE/ZERO BIT DETECTOR FOR FLOATING POINT OPERATION

BACKGROUND OF THE INVENTION

This invention relates to floating point operations, and more particularly to a method for detecting leading-ones or leading-zeros for the results of floating point operations, using input operands rather than waiting until the results are available.

In floating-point processors, a leading-1 detection mechanism is required in effective subtract operations and in integer-to-floating-point conversion operations. The sequence of four pipeline operations needed to implement an effective subtract operation when the absolute exponent difference is less than or equal to one, in a typical processor, are:

1 Align smaller operand and subtract (done in adder)
2. Complement fraction if sign is negative, and detect leading-1 position (done in leading-1 detector circuit)
3. Normalize the fraction (shifter)
4. Round the result if needed (done in adder)

The second pipeline stage can be merged with the first, eliminating one pipeline stage and thus speeding up the process, if the leading-1 detection is done on the input operands instead of on the result. The sequence of three pipeline operations for an effective subtract with exponent difference equal to zero or one, with leading-1 detection at the inputs:

1. Align smaller operand and subtract; Detect leading-1 or leading-0 position in the input operands (done in adder and leading-1 detector circuit)
2. Normalize the fraction (shifter)
3. Round the result if positive, or negate the result if negative (done in adder)

Leading-0 detection is required in the case where the result may be negative, such as an effective subtraction with an exponent difference equal to zero. Rounding is not needed for this particular case.

One example of a prior circuit for determining the leading-one/zero directly from the adder inputs is disclosed by Kershaw et al in "A Programmable Digital Signal Processor with 32b Floating Point Arithmetic," ISSCC 85, pp. 92-93, February 1985.

Another example of a method of is disclosed by Hokenek et al in "Leading-zero anticipator (LZA) in the EBM RISC System/6000 floating-point execution unit," ]IBM J. Res. Develop., January 1990, pp. 71-77. This circuit carries out processing of leading ones and zeros in parallel with floating-point addition.

SUMMARY OF THE INVENTION

Floating point addition and subtraction operations, depending upon the signs of the input operands, may be mapped to effective additions or subtractions that require the fraction components to be summed together or subtracted from one another. Multi-bit alignment may be required to normalize the floating point result of an effective subtract operation. The position of the leading-1 or leading-0 bit is used to determine the alignment required to normalize a positive or negative result, respectively.

In accordance with one embodiment of the invention, a circuit is provided for using the input operands of a floating point addition or subtraction operation to detect the leading one or zero bit position in parallel with the arithmetic operation. This allows the alignment to be performed on the available result in the next cycle of the floating point operation and results in a significant performance advantage. The leading 1/0 detection is decoupled from the adder that is computing the result in parallel, eliminating the need for special circuitry to compute a carry-dependent adjustment signal. The single-bit fraction overflow that can result from leading 1/0 misprediction is corrected with existing circuitry during a later stage of computation.

BRIEF DESCRIPTION OF THE DRAWINGS

The novel features believed characteristic of the invention are set forth in the appended claims. The invention itself, however, as well as other features and advantages thereof, will be best understood by reference to the detailed description of a specific embodiment, when read in conjunction with the accompanying drawings, wherein:

DETAILED DESCRIPTION OF SPECIFIC EMBODIMENT

Figures 1, 2:
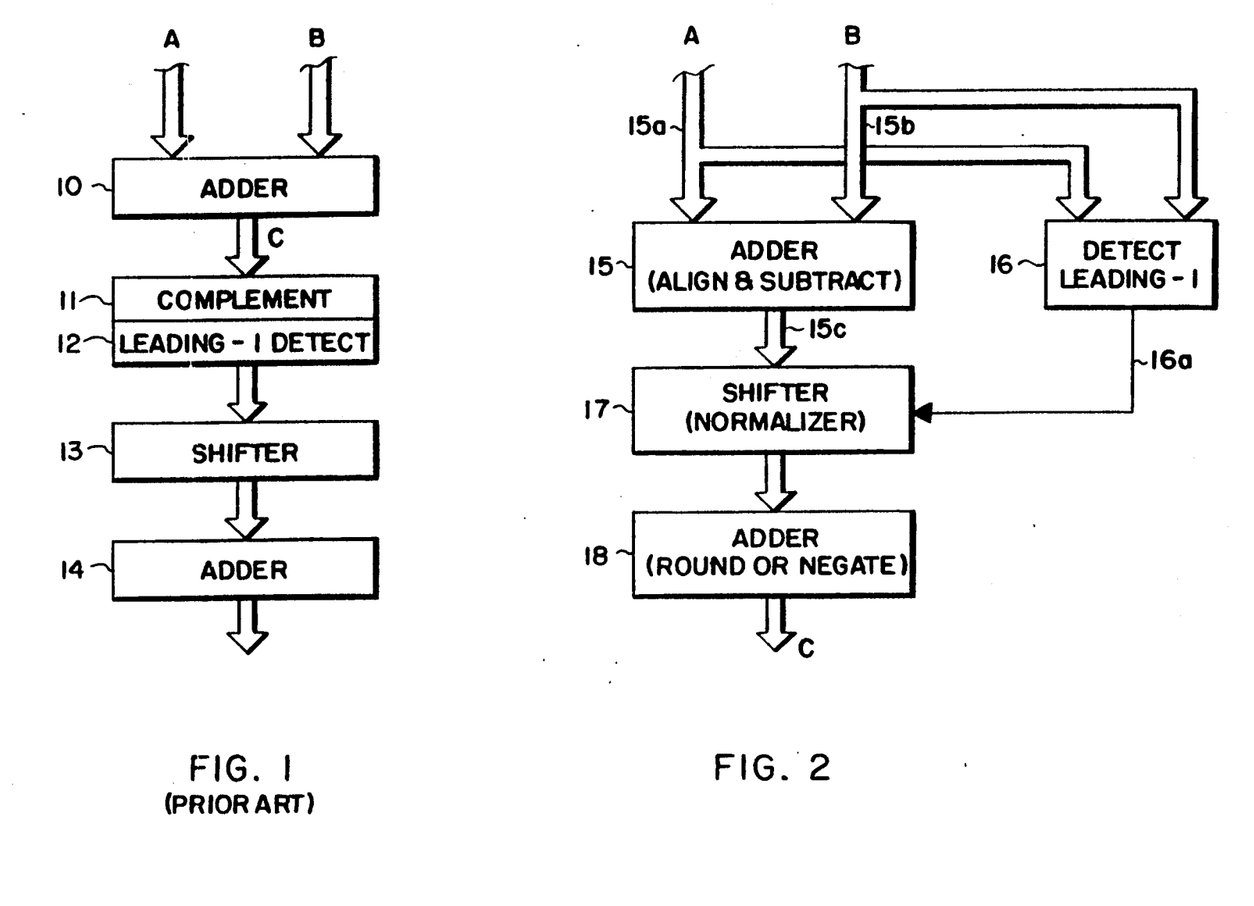
FIG. 1 is a diagram of a four-stage pipeline for performing leading 1/0 detection in sequence with an add/subtract operation in a floating point processor, according to the prior art.
FIG. 2 is a diagram of a three-stage pipeline for performing leading 1/0 detection in parallel with an add/subtract operation in a floating point processor, according to one embodiment of the invention.

Referring to FIG. 1, a part of a floating-point processor is shown using a leading-1 detection mechanism as previously used. A leading-1 detection mechanism is required in effective subtract operations and in integer-to-floating-point conversion operations. A sequence of four pipeline operations is needed to implement an effective subtract operation when the absolute exponent difference is less than or equal to one, in a typical processor such as that of FIG. 1. An operand A and an operand B are applied to the A and B inputs of an adder 10. In the first pipeline operation, the smaller operand B is aligned with the larger operand A, and subtract is performed to produce a result C, all this occurring in the adder 10. In the second pipeline operation, the fraction is complemented in complement circuit 11 if the sign of the result is negative and the leading-1 position is detected in leading-1 detector circuit 12. In the third pipeline operation, the fraction is normalized in the shifter 13. In the fourth pipeline operation, the result is rounded if positive, or negated if negative; this is done in adder 14 (which can be the same as adder 10).

According to the invention, referring to FIG. 2, the second pipeline stage can be merged with the first, eliminating one pipeline stage and thus speeding up the process, by doing the leading-1 or leading-0 detection on the input operands A and B instead of on the result C. A sequence of three pipeline operations is employed for an effective subtract with exponent difference equal to zero or one, with leading-1/0 detection at the inputs. First, the smaller operand B is aligned, and subtract is performed in the adder 15. Simultaneously, the leading-1 position (assuming a positive result) and the leading-0 position (assuming a negative result) is detected in the input operands A and B in leading-1/0 detector circuit 16. Second, the fraction is normalized in the shifter 17. Third, the result is rounded if positive, or negated if negative, in the adder 18. Thus, there is a saving of one pipeline stage, providing a performance gain. Leading-0 detection is required in the case where the result may be negative, such as an effective subtraction with an exponent difference equal to zero.

The circuitry used to implement the leading-1 or leading-0 detection for effective subtract operations according to one embodiment of the invention may also be used to determine the shift amount for conversion of integer to floating point data formats and as part of a sticky bit detection for floating point multiply operations as set forth in copending U.S. application Ser. No. 08/016,058 filed herewith by Madden et al and assigned to Digital Equipment Corporation, assignee of this invention (and incorporated herein by reference).

The leading-1 or leading-0 detection for effective subtract operations according to this example embodiment of the invention, as well as from the other uses of this function, falls into one of three cases (as will be further described below):

(i) A, B $>=0$ and C $>=0$ (i.e, both inputs are zero or positive numbers and the result is zero or a positive number)

(ii) (A $>=0$ and B$<0$) OR (A$<0$ and B$>=0$), C$>=0$ (i.e., one input is a negative number and the result is zero or a positive number)

(iii) (A $>=0$ and B$<0$) OR (A$<0$ and B$>=0$), C$<0$ (i.e., one input is a negative number and the result is a negative number)

where A and B are the input operands to an arithmetic unit 10 as illustrated in FIG. 2, and C is the result. The input operands are applied to inputs 15a and 15b of the arithmetic unit 15 and the result is available at an output 15c. According to the invention, as illustrated in FIG. 2, the input operands A and B are used to detect the leading-1 or leading-0 position in the result C, before the result C is available, by means of a parallel logic unit 16. The output 16a of the logic unit 16 is applied to a normalization circuit 17 to realign the result before it is loaded into an output register.

Figure 2A:
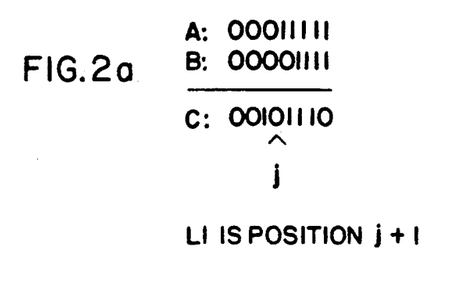
FIGS. 2a and 2b are numerical examples of floating point operations using leading-1 detection, for one condition.
Figure 2B:
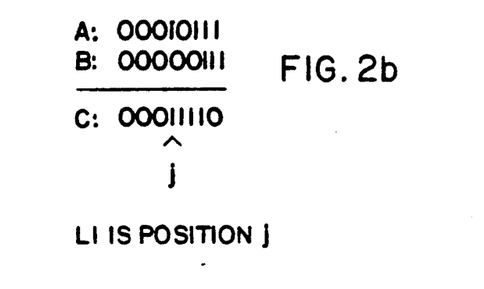

For case (i), where A, B $>=0$ and C $>=0$, numerical examples of the leading-1 detection method are illustrated in FIGS. 2a and 2b. The bits of operands A and B are scanned from left to right until a bit pair (in corresponding bit positions in A and B) is found such that $[A_j + B_j] = 1$. The leading "1" is guaranteed to be in position j or j+1 in C, depending on the carry-in to that bit position. In the example of FIG. 2a, the carry-in to position j in result C is a "1" so the leading one is at position j+1. In FIG. 2b, the carry-in to position j in result C is a "0" so the leading one is at position j.

Figure 3A:
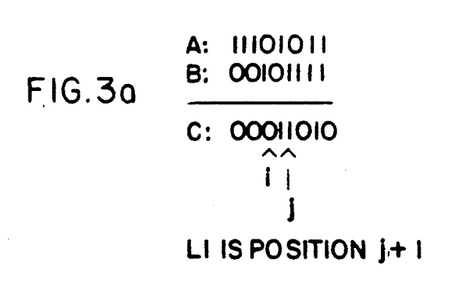
FIGS. 3a and 3b are numerical examples of floating point operations using leading-1 detection, for a second condition.
Figure 3B:
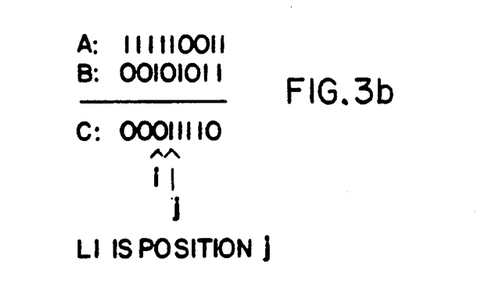

For case (ii), where (A $>=0$ and B$<0$) OR (A$<0$ and B$>=0$), C $>=0$ (i.e., one of the operands is negative but the result is still zero or positive), numerical examples are given in FIGS. 3a and 3b. The bits of operands A and B are scanned from left to right until a pair $[A_i, B_i]$ is found such that $[A_i, B_i] = [1,1]$ Unless the result C is zero, such a pair must exist in order for the result to be positive. The leading-1 search begins after this point, the scan continuing from left to right until a bit pair $[A_j, B_j]$ is found such that $[A_j + B_j] = 1$ (j $>$ i). The carry-dependent leading-1 is guaranteed to be in bit position j or j+1. In the example of FIG. 3a, the carry-in to position j in result C is a "1" so the leading one is at position j+1. In FIG. 3b, the carry-in to position j in result C is a "0" so the leading one is at position j.

Figure 4A:
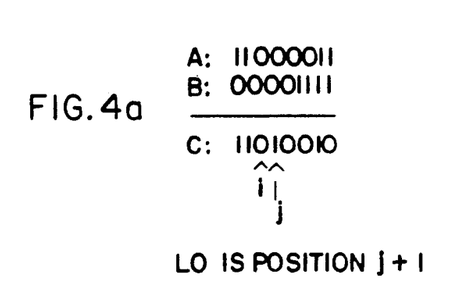
FIGS. 4a and 4b are numerical examples of floating point operations using leading-1 detection, for a third condition.
Figure 4B:
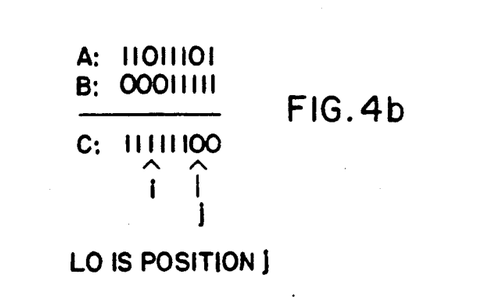

For case (iii), where (A $>=0$ and B$<0$) OR (A$<0$ and B$>0$), C $<0$ (i.e., one of the operands is negative and the result is negative), numerical examples are given in FIGS. 4a and 4b. The bits of operands A and B are scanned from left to right until a pair $[A_i, B_i]$ is found such that $[A_i, B_i] = [0,0]$ The leading-0 search begins after this point, the scan continuing from left to right until a bit pair $[A_j, B_j]$ is found such that $[A_j * B_j] = 0$(j $>$ i). The leading-0 is guaranteed to be in bit position j or j+1, depending on the carry into bit position j. In the example of FIG. 4a, the carry-in to position j in result C is a "1" so the leading zero is at position j+1. In FIG. 4b, the carry-in to position j in result C is a "0" so the leading zero is at position j.

Generalizing from the three cases discussed above, implementation of the leading 1/0 bit detection algorithm can be summarized as follows:

The bit pairs of the input operands A and B are scanned from left to right. The leading 1/0 search is enabled in bit position i when $A_{i+1}$ XOR $B_{i+1} = 0$. This is considered the "trigger point" for the leading 1/0 search. For positive values of the result C, the leading-1 is identified in the next bit position j (j$<$i) such that the jth bit pair satisfies the NOT(Kill) condition: $[A_j, B_j] = $ NOT[0,0]. For negative values of the result C, the leading-0 is identified in the next bit position j (j$<$i) such that the jth bit pair satisfies the NOT(GEN) condition: $[A_j, B_j] = $ NOT[1,1]. The leading 1/0 detection is disabled after the jth bit.

As shown in the examples of FIGS. 2a–4b, single-bit leading 1/0 misprediction is possible depending on the state of the carry-in to the jth bit pair. Built into a later stage of the computation is the ability to detect and correct for single-bit overflow of the fractional result. For operations in which correction due to leading 1/0 misprediction is required, it is not possible to have either rounding-induced overflow or fraction overflow of the intermediate result.

Based on this observation, it is possible to correct for misprediction of the leading 1/0 bit position with existing floating point unit circuitry. The cost of additional circuitry to compute the carry-dependent "adjustment" signal (as used in circuits of the Kershaw et al and Hokenek et al publications mentioned above) is eliminated. This also decouples the leading 1/0 detection from the 64-bit adder, reducing load requirements on the local bit carries which are not readily available in conditional sum or carry-lookahead adders.

For both positive and negative results the condition that initiates the leading 1/0 bit search is the same.

The approach taken in the Kershaw et al circuit is to select the appropriate search condition on a bit-by-bit basis by using the input operands to determine whether a leading-1 or a leading-0 operation is required. This method uses a single detection unit, but requires a way to filter out false trigger points once the leading 1/0 search has been initiated. The process of searching for a leading 1, for example, requires scanning over the bit pairs that satisfy the KILL condition without mistaking the [00] pairs for the trigger point in a leading-0 search.

The state that is required to maintain the correct search condition requires two levels of exclusive-OR logic to generate the mux control for the leading 1/0 selection. The approach taken according to this invention is to implement two parallel detection units. one for leading-1 detection and another for leading-0 detection. The leading 1/0 detection is done in parallel with the floating point addition or subtraction, and the sign of the result is used to select the correct leading 1/0 bit output. The search condition at the input of each detection unit is fixed for afl bit positions.

Figure 5:
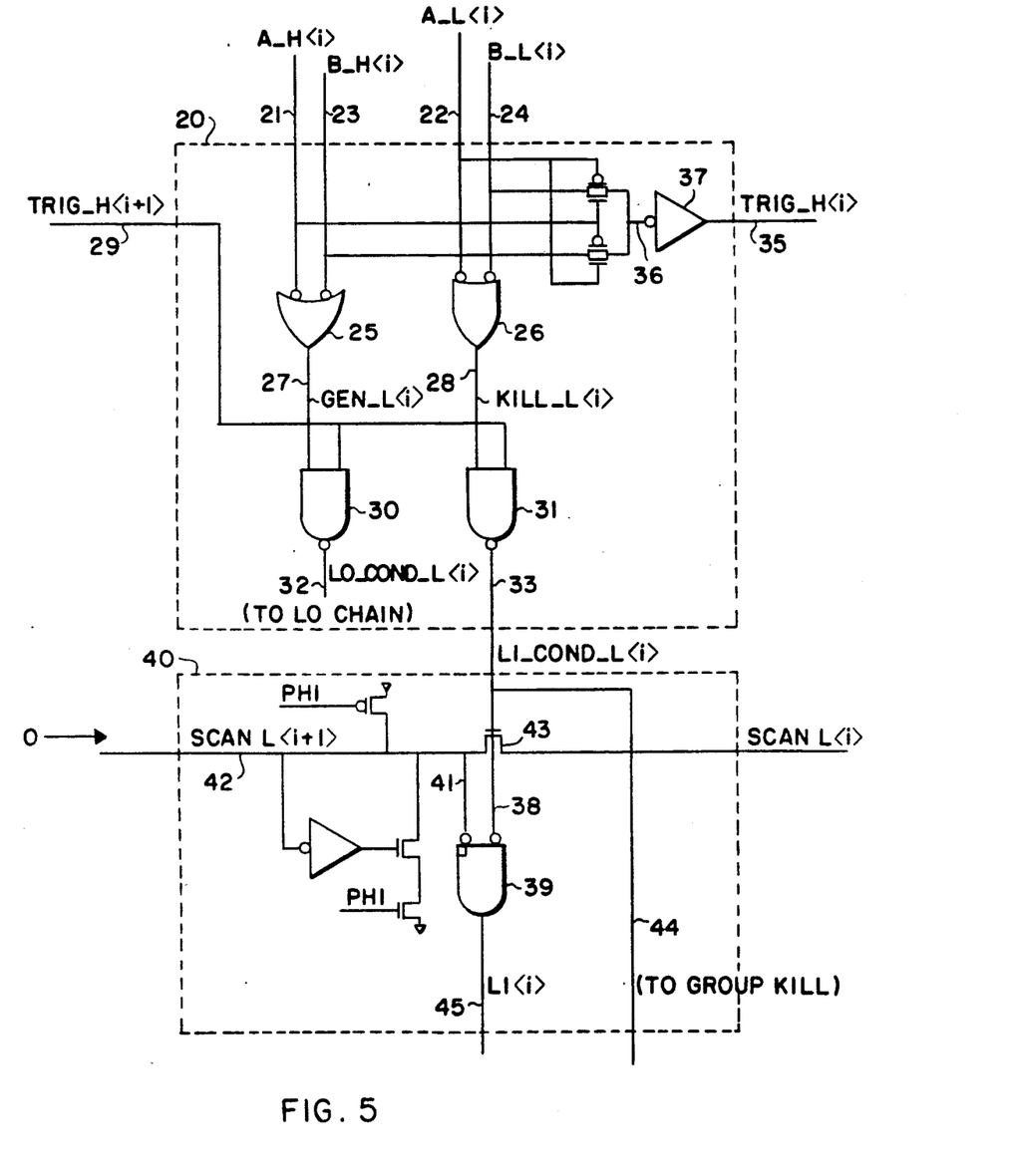
FIG. 5 is an electrical diagram of a leading 1/0 detection circuit for use in a floating point processor according to one embodiment of the invention.

Referring to FIG. 5, a leading 1/0 detection unit for the circuit 16 is shown according to one embodiment of the invention. This circuit is a leading-1 and leading-0 detector for only one bit position i, it being understood that there is a circuit as in FIG. 5 for each bit position of the operands A and B. For bit position i of input operands A and B, the true and complement voltages are applied to an input stage 20 by lines 21, 22 (from A) and lines 23, 24 (from B). The inputs 21, 23 are applied to a NAND gate 25, and the inputs 22, 24 are applied as inverted inputs to an NAND gate 26 (implementing a logical OR). These gates produce the GEN and Kill outputs (active low) on lines 27 and 28, so if this circuit 20 is triggered in the scan, by a trigger input 29 from the bit position to the left (i+1), a leading-0 or a leading-1 condition (active low) is signaled by NAND gates 30 or 31. The output 32 from NAND gate 30 is applied to the leading-0 chain, and the output 33 from NAND gate 31 is applied to the leading-1 chain. That is, if either $A_i$ or $B_i$ is low on inputs 21 and 23 the NOT(GEN) function on output 27 is active high. If either $A_i$ or $B_i$ is high causing either input 22 or 24 to be low, the NOT(KILL) output on line 28 is active (high). The trigger signal (active high) will be sent on to the next bit position by line 35 if a node 36 before the inverter 37 is low, which is true according to the following table (it being understood that the chain output also depends on the state of the scan input, so the previous state is assumed):

from left to right (more significant toward less significant) if the L1 line 33 is high (not asserted) but stops the scan if the line 33 is in the asserted condition (low). The leading-1 condition line 33 is also applied by line 44 to the group kill circuit. The output 45 of the AND gate 39 is applied to a leading-1 combination circuit responsive to all of the lines 45 and to the group kill lines 44. The leading-0 condition signal on line 32 is applied to a circuit similar to the circuit 40 which functions in the same way to produce a leading-0 indication.

The chain is precharged high at the same time the input scan conditions (propagate, generate and kill) are set up. During the evaluation phase, a zero voltage is propagated from left to right by scan line 42 until a leading 1/0 bit position is identified. Inhibiting the zero propagation by transistor 43 through the remainder of the chain disables the leading 1/0 bit search, and ensures the L1/L0 outputs are mutually exclusive.

Figure 6A:
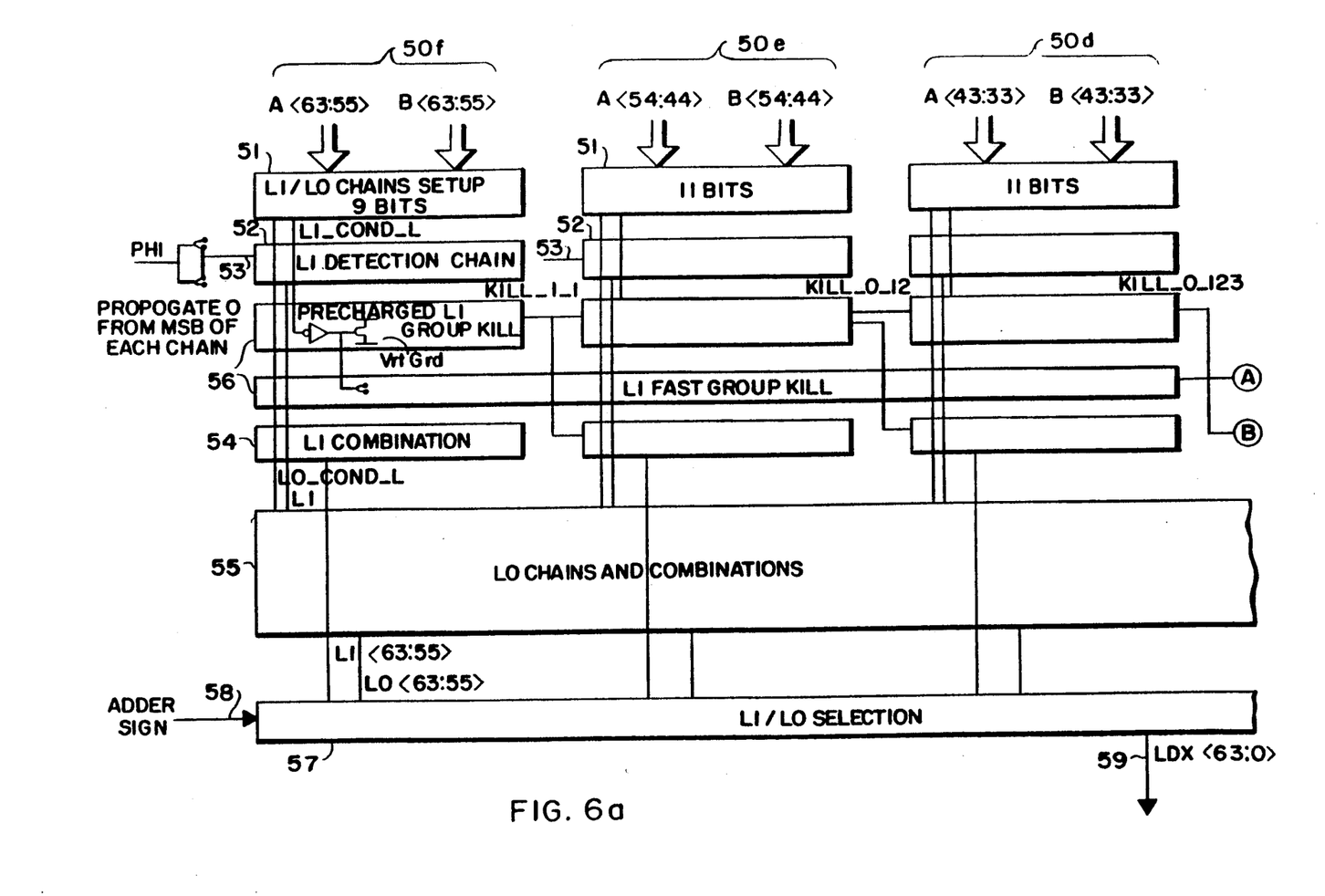
FIG. 6 comprising FIGS. 6a–6b, a block diagram of a wide-word leading 1/0 detector using the circuits of FIG. 5.
Figure 6B:
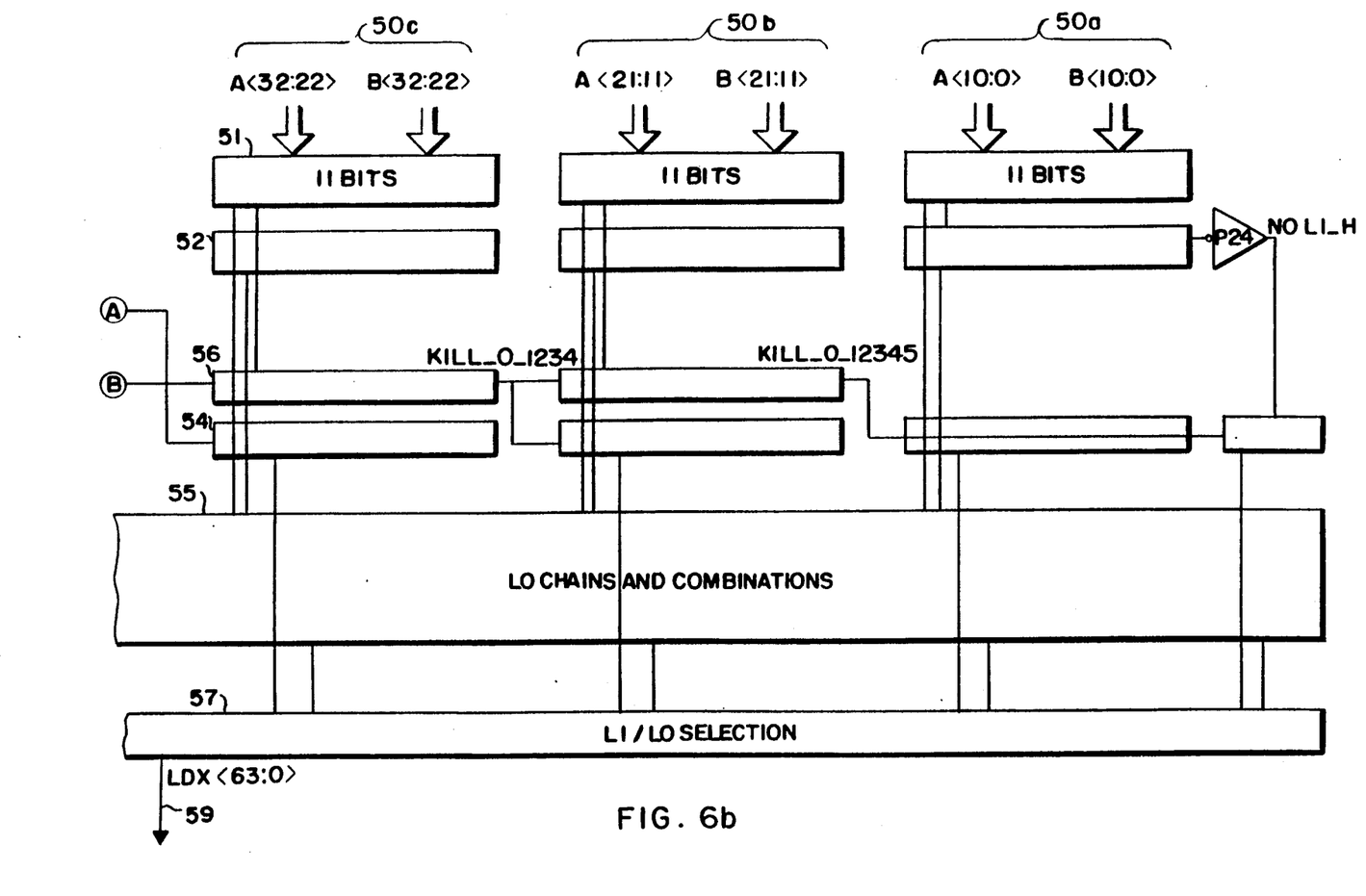

Referring to FIG. 6, in order to implement fast leading 1/0 detection on a wide datapath, the detection units may be broken up into subgroups 50a, 50b, 50c, etc., that operate in parallel with one another. Five 11-bit subgroups and one 9-bit subgroup provide a 64-bit total datapath width. The group 50f, for example, receives bits $A<63:55>$ and $B<63:55>$ in circuit 51 which consists of nine sets of the circuit 20 of FIG. 5. A leading-1 detection chain 52, consisting of nine sets of the circuit 40 of FIG. 5, has a zero propagated from the left on the scan line. The outputs from circuit 52 (corresponding to lines 45 of FIG. 5) are applied to a leading-1 combination circuit 54. The outputs indicating leading-0, corresponding to lines 32 of FIG. 5, are applied to leading-0 chains 55 like the leading-1 chains and combination circuit. If one or more bit pairs in a group satisfies the leading 1/0 bit condition as explained above, then the leading 1/0 bit output is disabled for all successive groups (to the right). Organization of the lookahead group kill circuits 56 may be chosen to balance critical circuit delays. In the circuit of FIG. 6, for example, the worst-case group kill delays (Kill__12345 and Kill__123) are well-matched to the worst-case scan delay that occurs when the leading 1/0 bit is located in the least significant bit position of the serial chain.

The sign of the adder 15 that computes the result in parallel is used to select the correct leading 1/0 output in a circuit 57. This sign from the adder appears on a line 58. The output 59 is a 64-bit value with one bit active, indicating the leading 1/0.

Performing the leading 1/0 detection on the input operands A and B eliminates one cycle of the floating point subtraction operation. The use of two parallel detection units results in a fixed search criterion that reduces the number of gate delays required to set the

| A 21 | B 23 | NOT A 22 | NOT B 24 | NOT GEN 27 | NOT KILL 28 | NOT L0 32 | NOT L1 33 | Node 36 | Trig__H 35 |
|---|---|---|---|---|---|---|---|---|---|
| 0 | 0 | 1 | 1 | 1 | 0 | 0 | 1 | 0 | 1 |
| 1 | 0 | 0 | 1 | 1 | 1 | x | x | 1 | 0 |
| 0 | 1 | 1 | 0 | 1 | 1 | x | x | 1 | 0 |
| 1 | 1 | 0 | 0 | 0 | 1 | 1 | 0 | 0 | 1 | x: can only occur after scan path is disabled (SCAN__L $< i + 1 > = 1$)

The leading-1 condition signal (active low) on line 33 is applied to an inverting input 38 of an AND gate 39 in a leading-1 detector circuit 40 (one for each bit position), with the other inverting input 41 coming from a scan line 42. A transistor 43 in series with the scan line 42 in each bit position allows the scan (a "0") to proceed scan condition logic. Leading 1/0 detection on wide datapaths may be broken into parallel groups to accelerate the computation time. The leading 1/0 detection circuit 16 and the 64-bit adder 15 can operate in parallel, with each requiring one cycle to complete.

Single-bit correction for leading 1/0 misprediction may be done at a later computation stage, thereby eliminating the need for special hardware and decoupling the adder from the detection circuit.

While the invention has been described with reference to a specific embodiment, the description is not meant to be construed in a limiting sense. Various modifications of the disclosed embodiment, as well as other embodiments of the invention, will be apparent to persons skilled in the art upon reference to this description. It is therefore contemplated that the appended claims will cover any such modifications or embodiments which fall within the true scope of the invention.

What is claimed is:

1. A method for performing a floating point operation, comprising the steps of:
   (a) applying a first n-bit floating point operand and a second n-bit floating point operand to an arithmetic unit to perform said floating point operation on said first n-bit floating point operand and said second n-bit floating point operand and to generate a floating point result at an output of the arithmetic unit;
   (b) detecting a leading one position or leading zero position by:
      (i) scanning each bit position of both of said first n-bit floating point operand and said second n-bit floating point operand from left to right to detect a trigger condition:

$$A_{i+1} \text{ XOR } B_{i+1} = 0$$

where A is the first n-bit floating point operand, B is the second n-bit floating point operand, $A_i$ or $B_i$ is the value of a bit in position i in A or B, $A_{i+1}$ or $B_{i+1}$ is the value of a bit one position to the left of $A_i$ or $B_i$, and XOR is an Exclusive-OR operator;
      (ii) continuing to scan from left to right, and, if said floating point result is a positive value, detecting a next bit position j where:

$$[A_j, B_j] = \text{NOT}[0,0]$$

where $j < i$, $A_j$ or $B_j$ is the value of a bit in position j in A or B, and designating said bit position j where $[A_j, B_j] = \text{NOT}[0,0]$ as the leading one position in the floating point result, or, if said floating point result is a negative value, detecting a next bit position j where:

$$[A_j, B_j] = \text{NOT}[1,1]$$

and designating said bit position j where $[A_j, B_j] = \text{NOT}[1,1]$ as the leading zero position in the floating point result;
   (c) and aligning said floating point result to said leading one position if the floating point result is a positive value or to said leading zero position if said floating point result is a negative value.

2. A method according to claim 1 wherein said step of detecting is performed simultaneously with and in parallel to said operation in said arithmetic unit.

3. A method acording to claim 2 wherein said steps of applying, detecting and aligning are all performed in a single-chip integrated circuit device containing said floating point processor.

4. A floating point processor, comprising:
   (a) an arithmetic unit, and means for applying a first n-bit floating point operand and a second n-bit floating point operand to inputs of said arithmetic unit to perform a floating point operation on said first n-bit floating point operand and said second n-bit floating point operand and generate a floating point result at an output of the arithmetic unit;
   (b) a leading one position or leading zero position detection circuit including:
      (i) means for scanning each bit position of both of said first n-bit floating point operand and said second n-bit floating point operand from left to right to detect a trigger condition:

$$A_{i+1} \text{ XOR } B_{i+1} = 0$$

where A is the first n-bit floating point operand, B is the second n-bit floating point operand, $A_i$ or $B_i$ is the value of a bit in position i in A or B, $A_{i+1}$ or $B_{i+1}$ is the value of a bit one position to the left of $A_i$ or $B_i$, and XOR is an Exclusive-OR operator;
      (ii) means for continuing to scan from left to right, and, if said floating point result is a positive value, detecting a next bit position j where:

$$[A_j, B_j] = \text{NOT}[0,0]$$

where $j < i$, $A_j$ or $B_j$ is the value of a bit in position j in A or B, and designating said bit position j where $[A_j, B_j] = \text{NOT}[0,0]$ as the leading one position in the floating point result, or, if said floating point result is a negative value, detecting a next bit position j where:

$$[A_j, B_j] = \text{NOT}[1,1]$$

and designating said bit position j where $[A_j, B_j] = \text{NOT}[1,1]$ as the leading zero position in the floating point result;
   (c) and means for aligning said floating point result to said leading one position if the floating point result is a positive value or to said leading zero position if said floating point result is a negative value.

5. Apparatus according to claim 4 wherein said leading one or leading zero detection circuit operates simultaneously with and in parallel to said operation in said arithmetic unit.

6. Apparatus according to claim 5 wherein said arithmetic unit, said detection circuit, and said means for aligning are all contained in a single-chip integrated circuit device containing said floating point processor.

7. A method for detecting a leading one position or leading zero position for a floating point operation, comprising the steps of:
   (i) scanning each bit position of both a first n-bit floating point operand and a second n-bit floating point operand from left to right to detect a trigger condition:

$$A_{i+1} \text{ XOR } B_{i+1} = 0$$

where A is the first n-bit floating point operand, B is the second n-bit floating point operand, $A_i$ or $B_i$ is the value of a bit in position i in A or B, $A_{i+1}$ or $B_{i+1}$ is the value of a bit one position to the left of $A_i$ or $B_i$, and XOR is an Exclusive-OR operation;
   (ii) continuing to scan from left to right, and, if a floating point result of said floating-point operation on said first n-bit floating point operand and said second n-bit floating point operand is a positive value, detecting a next bit position j wherein:

$$[A_j, B_j] = \text{NOT}[0,0]$$

where $j < i$, $A_j$ or $B_j$ is the value of a bit in position j in A or B, and designating said bit position j where $[A_j, B_j] = \text{NOT}[0,0]$ as the leading one position in the floating point result, or, if said floating point result of said floating point operation on said first n-bit floating point operand and said second n-bit floating point operand is a negative value detecting a next bit position j where:

$$[A_j, B_j] = \text{NOT}[1,1]$$

and designating said bit position j where $[A_j, B_j] = \text{NOT}[1,1]$ as the leading zero position in the floating point result.

8. A method according to claim 7 wherein said step of scanning is performed simultaneously with and in parallel to operate in an adder unit.

9. A leading one position or leading zero position detection circuit for a floating point operation comprising:
   (i) means for scanning each bit position of both a first n-bit floating point operand and a second n-bit floating point operand from left to right to detect a trigger condition:

$$A_{i+1} \text{ XOR } B_{i+1} = 0$$

where A is the first n-bit floating point operand, B is the second n-bit floating point operand, $A_i$ or $B_i$ is the value of a bit in position i in A or B, $A_{i+1}$ or $B_{i+1}$ is the value of a bit one position to the left of $A_i$ or $B_i$, and XOR is an Exclusive-OR operator;
   (ii) mans for continuing to scan from left to right, and, if a floating point result of said floating point operation is a positive value, detecting a next bit position j where:

$$[A_j, B_j] = \text{NOT}[0,0]$$

where $j < i$, $A_j$ or $B_j$ is the value of a bit in position j in A or B, and designating said bit position j where $[A_j, B_j] = \text{NOT}[0,0]$ as the leading one position in the floating point result, or, if said floating point result of said floating point operation is a negative value, detecting a next bit position j where:

$$[A_j, B_j] = \text{NOT}[1,1]$$

and designating said bit position j where $[A_j, B_j] = \text{NOT}[1,1]$ as the leading zero position in the floating point result.

10. Apparatus according to claim 9 wherein said leading one or leading zero detection circuit operates simultaneously with and in parallel to an operation in an arithmetic unit.

11. Apparatus according to claim 10 wherein said arithmetic unit and said detection circuit are all contained in a single-chip integrated circuit device.

12. A method for performing a floating point operation, comprising the steps of:
    (a) applying a first n-bit floating point operand and a second n-bit floating point operand to an arithmetic unit to perform said floating point operation on said first n-bit floating point operand and said second n-bit floating point operand and generate a floating point result at an output of the arithmetic unit;
    (b) detecting a leading one position in parallel with the floating point operation performed by the arithmetic unit;
    (c) detecting a leading zero position in parallel with the floating point operation performed by the arithmetic unit;
    (d) determining whether the floating point result generated by the arithmetic unit is a positive value or a negative value;
    (e) selecting the leading one position if the floating point result is a positive value or the leading zero position if the floating point result is negative value; and
    (f) aligning said floating point result to said leading one position if the floating point result is a positive value or to said leading zero position if said floating point result is a negative value.

13. The method of claim 12, wherein the step of detecting a leading one position further comprises the steps of:
    (a) scanning each bit position of both of said first n-bit floating point operand and said second n-bit floating point operand from left to right to detect a trigger condition:

$$A_{i+1} \text{XOR } B_{i+1} = 0$$

where A is the first n-bit floating point operand, B is the second n-bit floating point operand, $A_i$ or $B_i$ is the value of a bit in position i in A or B, $A_{i+1}$ or $B_{i+1}$ is the value of a bit one position to the left of $A_i$ or $B_i$, and XOR is an Exclusive-OR operator; and
    (b) upon detecting said trigger condition, continuing to scan from left to right and detecting a next bit position j where:

$$[A_j, B_j] = \text{NOT}[0,0]$$

where $j < i$, $A_j$ or $B_j$ is the value of a bit in position j in A or B, and designating said bit position j as the leading one position.

14. The method of claim 12 wherein the step of detecting a leading zero further comprises the steps of:
    (a) scanning each bit position of both of said first n-bit floating point operand and said second n-bit floating point operand from left to right to detect a trigger condition:

$$A_{i+1} \text{XOR } B_{i+1} = 0$$

where A is the first n-bit floating point operand, B is the second n-bit floating point operand, $A_i$ or $B_i$ is the value of a bit in position i in A or B, $A_{i+1}$ or $B_{i+1}$ is the value of a bit one position to the left of $A_i$ or $B_i$, and XOR is an Exclusive-OR operator; and
    (b) upon detecting said trigger condition, continuing to scan from left to right, and detecting a next bit position j where:

$$[A_j, B_j] = \text{NOT}[1,1]$$

where $j < i$, $A_j$ or $B_j$ is the value of a bit in position j in A or B, and designating said bit position j as the leading zero position.

15. A floating point processor, comprising:
   (a) an arithmetic unit for performing a floating point operation on operands to generate a floating point result at an output of said arithmetic unit;
   (b) means for applying a first n-bit floating point operand and a second n-bit floating point operand to the arithmetic unit;
   (c) means for detecting a leading one position in parallel with the floating point operation performed by the arithmetic unit;
   (d) means for detecting a leading zero position in parallel with the floating point operation performed by the arithmetic unit;
   (e) means for determining whether the floating point result is a positive value or a negative value;
   (f) means for selecting the leading one position if the floating point result is a positive value or the leading zero position if the floating point result is negative value; and
   (g) means for aligning said floating point result to said leading one position if the floating point result is a positive value or to said leading zero position if said floating point result is a negative value.

16. The floating point processor of claim 15 wherein the means for detecting a leading zero position further comprises:
   (a) means for scanning each bit position of both of said first n-bit floating point operand and said second n-bit floating point operand from left to right to detect a trigger condition:

$$A_{i+1} \text{ XOR } B_{i+1} = 0$$

where A is the first n-bit floating point operand, B is the second n-bit floating point operand, $A_i$ or $B_i$ is the value of a bit in position i in A or B, $A_{i+1}$ or $B_{i+1}$ is the value of a bit one position to the left of $A_i$ or $B_i$, and XOR is an Exclusive-OR operator; and
   (b) upon detecting said trigger condition, means for continuing to scan from left to right and detecting a next bit position j where:

$$[A_j, B_j] = \text{NOT}[0,0]$$

where $j < i$, $A_j$ or $B_j$ is the value of a bit in position j in A or B, and for designating said bit position j as the leading one position.

17. The floating point processor of claim 15 wherein the means for detecting a leading zero position further comprises:
   (a) means for scanning each bit position of both of said first n-bit floating point operand and said second n-bit floating point operand from left to right to detect a trigger condition:

$$A_{i+1} \text{ XOR } B_{i+1} = 0$$

where A is the first n-bit floating point operand, B is the second n-bit floating point operand, $A_i$ or $B_i$ is the value of a bit in position i in A or B, $A_{i+1}$ or $B_{i+1}$ is the value of a bit one position to the left of $A_i$ or $B_i$, and XOR is an Exclusive-OR operator; and
   (b) upon detecting said trigger condition, means for continuing to scan from left to right, and detecting a next bit position j where:

$$[A_j, B_j] = \text{NOT}[1,1]$$

where $j < i$, $A_j$ or $B_j$ is the value of a bit in position j in A or B, and for designating said bit position j as the leading zero position.

* * * * *